United States Patent Office.

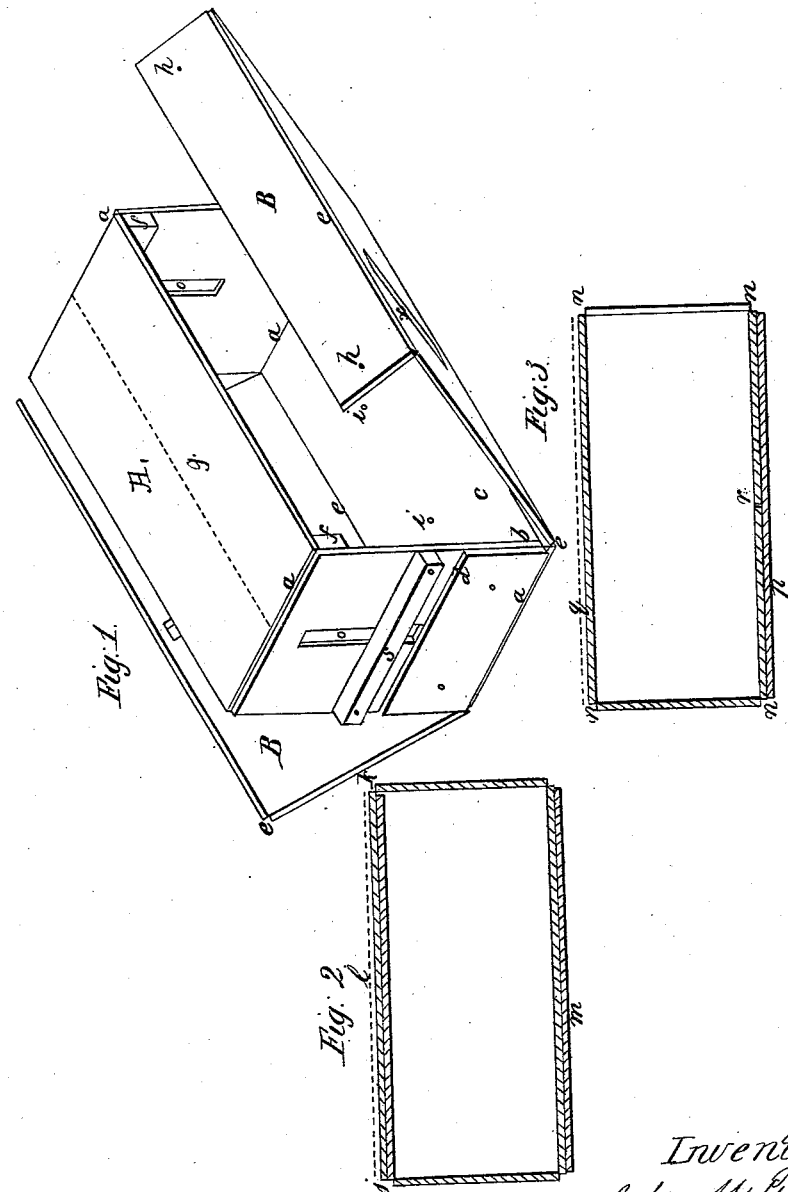

JOHN M. PERKINS, OF PLAINFIELD, NEW JERSEY, ASSIGNOR TO R. R. PERKINS, OF SAME PLACE.

Letters Patent No. 82,438, dated September 22, 1868.

IMPROVED FRUIT-BOX.

*The Schedule referred to in these Letters Patent and making part of the same.*

TO ALL WHOM IT MAY CONCERN:

Be it known that I, JOHN M. PERKINS, of Plainfield, in the county of Union, and State of New Jersey, have invented a new and useful Box for Packing and Marketing Grapes, Berries, and other small fruit; and I do hereby declare that the following is a full and exact description thereof, reference being had to the accompanying drawings, and to the letters of reference marked thereon.

The nature of my invention consists in constructing a square or oblong square box for packing and marketing grapes, berries, or other small fruit, with the sides and ends thereof formed of one strip of veneer, and the top and bottom thereof of a second strip of veneer, so arranged and connected with the square or oblong square framework as to form a wrapper therefor, and to allow either the top or bottom to be used as bottom or top indiscriminately; by which arrangement I enable the purchaser to as readily examine that portion of the fruit first placed in the box of the marketman as that last packed, the object being to prevent the deceptions sometimes practised by marketmen in covering inferior fruit with a layer of fruit of better quality.

Figure 1 is a perspective of one form of my box, partially closed.

A is the square or oblong-framework, which is made of a single strip of veneer, slotted at $o$ $o$, or more or less of the slots, to give a greater or less amount of ventilation, the number and size of the slots to suit the kind of fruit to be packed.

This veneer is scored or partially cut through on the external surface at the lines $a$ $a$ $a$ $a$. The veneer is then bent around a suitable "former," into the square or oblong square form which the box is destined to assume, the end, $b$, of the veneer being carried back against the inner surface $c$ of the back of the box-frame A, and the other extremity, $d$, being brought around and lapped over the end, $b$, to which it is united by tacks, or otherwise. Parts $ff$ may, if desired, be attached to the interior of the corners of the framework to stiffen it. It is now ready for the wrapper.

B is the wrapper, which is formed of a single strip of veneer, the width of which is precisely the length of the box, and the length of which is sufficient to encircle the frame A. This wrapper is scored or cut partially through on the outside, at the lines $e$ $e$ $e$ $e$, by which the wrapper is divided into five parts, having four hinges formed by that portion of the fibre of the veneer which remains unsevered after scoring.

Slots, represented at $x$, may be cut in the wrapper to increase the ventilation of the fruit. The middle division of the wrapper is placed against the exterior of the back, $c$, of the framework A, and permanently connected thereto by tacks $i$ $i$, or other equivalent means.

The box is closed by bringing the wrapper to its place around the frame, and the two extremities are brought in opposition to each other at the dotted line $g$, along the centre of the front side of the box, thus forming one of the double sides of the box when closed, where they are held with sufficient firmness by tacks $h$ $h$, or by a band or string. Either of the open ends of the frame thus constitutes the top of the box, and either constitutes the bottom thereof.

In opening the box to remove its contents, either flap may be lifted up by withdrawing the temporary tacks $h$ $h$, or by removing the band or string; and in inspecting the fruit, both flaps may be alternately elevated, and thus a view may be had of both the top and the bottom of the contents of the box.

S represents a cleat, fastened, by tacks or otherwise, to one or both ends of the box to make space between the boxes when packed in crates or chests for transporting, to insure a more perfect ventilation.

Figure 2 shows a horizontal section of frame for a box, in which, instead of being lapped at the end, as shown at $d$, fig. 1, the lap occurs at the side, and extends the entire length of the frame from J to K. This would form a frame with two thicknesses of veneer at one side and one thickness at the other side, which, on receiving the additional thickness of the wrapper B, fig. 1, would constitute, when closed, a box of single ends, top and bottom, and with its front or back composed respectively of two and three thicknesses, the line $m$ and the dotted line $l$ exhibiting the added thickness of the wrapper.

Another variation of the frame is shown in Figure 3. Here the veneer is not lapped, but is so scored at n n n n as to form the appropriate shape, and the two ends of the veneer are brought in opposition at r, and permanently attached to the middle division of the wrapper B, fig. 1, the ends being brought around and temporarily tacked, as before described. This forms a completed box, with double back and front, as shown by line p and dotted line g, fig. 3.

The size of the veneer used for the frame is less than in either of the others described, as none is used for overlapping.

I do not claim constructing a box with its upper or lower sides hinged and made movable, so that the box may be filled from one side, permanently closed at that opening, and the other or bottom side used as the top in removing the fruit; but

What I claim, is—

A box constructed of two strips of veneer, in which the top or bottom may be used as bottom or top indiscriminately, and constructed of two pieces of veneer, in the manner and for the purposes set forth.

JOHN M. PERKINS.

Witnesses:
FRANK FULLER,
WM. H. BATES.